United States Patent
Schmidt

[11] 3,879,982
[45] Apr. 29, 1975

[54] METHOD AND APPARATUS FOR TESTING HARDNESS OF SPECIMENS

[76] Inventor: Ernst Schmidt, Reiserstrasse 29, 4132 Muttenz, Switzerland

[22] Filed: Mar. 8, 1974

[21] Appl. No.: 449,459

Related U.S. Application Data

[63] Continuation-in-part of Ser. No. 298,006, Oct. 16, 1972, abandoned.

[52] U.S. Cl. .............................. 73/12; 73/79; 73/82
[51] Int. Cl. ............................................. G01n 3/30
[58] Field of Search ............................. 73/12, 79, 82

[56] References Cited
UNITED STATES PATENTS

| | | | |
|---|---|---|---|
| 2,664,743 | 1/1954 | Schmidt | 73/79 |
| 3,333,461 | 8/1967 | Gordon et al. | 73/12 |

*Primary Examiner*—James J. Gill
*Assistant Examiner*—Anthony V. Ciarlante
*Attorney, Agent, or Firm*—McGlew and Tuttle

[57] ABSTRACT

A method of testing specimens for hardness using a movable striking member and a specimen contacting probe which is moved by the striking member to contact the specimen and also using an electrical chronometer which is connected between the probe and the striking member, comprises placing the probe directly adjacent the specimen and moving the striking member to hit the probe to cause it to move away from the striking member and to start the electrical chronometer and to penetrate the specimen, and thereafter permitting the probe to move backwardly into contact with the striking member after rebound from the specimen to stop the chronometer. The time which is indicated by the chronometer is a measurement of the hardness. An apparatus for this method comprises an impact tool which has a housing with a striking member therein which is movable through a path intercepting an impact probe which is capable of moving out of the end of the housing to strike the specimen. The apparatus includes means for exposing the striking member so that it may be accelerated rapidly such as by the blow of a hammer or by the falling of a weight or by the release of a spring and an electrical chronometer is arranged so that its circuit has contacts which are connected when the striking member first contacts the probe and are stopped after the striking member hits the specimen and rebounds into a second contact with the probe.

9 Claims, 10 Drawing Figures

METHOD AND APPARATUS FOR TESTING HARDNESS OF SPECIMENS

REFERENCE TO ANOTHER APPLICATION

This application is a continuation-in-part of application Ser. No. 298,006, now abandoned filed Oct. 16, 1972 by the same inventor.

BACKGROUND OF THE INVENTION

1. Field of the Invention

This invention relates in general to the construction of devices for testing hardness and in particular to a new and useful method and apparatus for testing the hardness of a specimen by measuring the time which is elapsed between an impact of an impact member with a probe to the time in which the probe is moved by the impact into association with the specimen and rebounds into contact with the striking member once again.

2. Description of the Prior Art

Numerous, widely differing hardness testing methods and forms of apparatus exist in which a probe is pressed (static method) or struck (dynamic method) onto the surface of a specimen.

In the known static methods (for example those of Brinell, Vickers and Rockwell) and in the dynamic plastic methods a probe, for example a steel ball, diamond pyramid or diamond cone, is pressed into or on to the surface of the specimen in order to produce in the specimen an impression whose width or depth is measured as a criterion of the specimen's hardness. These methods have the disadvantage that some specimens are extremely liable to damage and are expensive, and that the optical measurement of the impression produced by the probe requires exceedingly complicated and expensive equipment which normally is fixed and not portable and therefore cannot be used on large, fixed specimens. The most serious disadvantages of these methods, however, are that the measurement of the impression produced is a linear measurement, that relatively accurate linear measurements with extremely small linear differences such as occur in the gauging of the impressions require very complicated and expensive instruments, and that even so, in the dynamic plastic methods, the relationship between the hardness and the impression size causes a measuring error of only 1% to lead to a 4% error in the hardness value obtained.

In the dynamic elastic (or rebound) methods, on the other hand, a striking member strikes a probe on to the specimen in the manner initially described, whereupon the striking member bounces back off the specimen with an energy which represents the difference between the impact energy and the energy absorbed, and which is therefore a suitable measure of the specimen's hardness. Testing by these methods is quick and simple. If the striking force is suitably varied they leave only very small permanent impressions in the specimen's surface, so that they are also suitable for testing brittle or impact-sensitive workpieces. The small amount of equipment required is compact, light and very convenient, so that these methods can also be applied where static methods cannot, for example to the testing of installed machine parts, concrete floors, wall plastering, concrete roads, runways and other concrete and structural members used in the construction of buildings, bridges, roads and the like.

In the commonest and best known hardness testers operating by the rebound method (e.g. that of Shore and Schmidt's concrete testing hammer) the height of the rebound is measured as a criterion of the hardness of the specimen. For example, a spherical probe of accurately determined weight is allowed to fall freely from an accurately predetermined height down a vertical chute, in which it runs with as little friction as possible, on to the specimen, whereupon the probe bounces back off the specimen and the height of its rebound is measured. The ball may be a combined striking member and probe. Instead of a single component a drop hammer may be used, this hammer forming the stroke-producing weight and being provided at its bottom end with a spherical or pin-like probe. Testers of the above-mentioned type are suitable only for testing horizontal surfaces. Vertical surfaces may be tested with probes suspended like pendulums, which strike the side of the specimen. These methods and forms of apparatus, however, suffer from the disadvantage that the criterion for the hardness of the specimen is the rebound height, and that for the reasons already given it is extremely difficult to make sufficiently precise linear measurements, with the result that hardness values obtained in this way are not very accurate.

To make the values more accurate a rebound hardness tester was proposed (German Auslegeschrift No. 1,187,394) which, instead of making a linear measurement of the rebound height, made a time measurement of the time of travel corresponding to the rebound height. Just as in Shore's rebound hardness test, described above, a spherical probe falls from a given height along a vertical tube. When the probe strikes the surface of the specimen the light beam in a photoelectric barrier is interrupted and an electrical pulse is fed to an electric or an electronic chronometer. The probe bounces off the specimen and back up the tube, then drops down again and hits the specimen a second time, again interrupting the light beam and sending an electrical pulse to the chronometer. The time between the two successive impacts of the probe on the specimen is measured by the chronometer and provides a criterion of the specimen's hardness. Measuring the time, which can be done very accurately, avoids the disadvantages of inaccurate linear measurement. It does not, however, avoid the following serious disadvantages from which both the said tester and the rebound hardness testers described earlier suffer, i.e., that the measuring results are highly dependent on the power of the stroke. This is obviously a great weakness, since if the measuring results are to be reproducible there must always be uniform acceleration to produce uniform thrusting or striking energy. The testers and results are therefore highly dependent on direction and position. Even slight inclination of the tester gives distinctly different results, with the result that the measuring operation is made much harder by the need to keep the tester in a particular position. Above all, however, the known methods and testers fail if the mass of the specimen is not very large compared with the stroke-producing mass of the tester. That is to say, the specimen must have a substantially higher mass than the striking member and/or probe, or must be rigidly mounted on a foundation having a large mass.

In another existing proposal the criterion for the hardness of the specimen is not the rebound height or rebound duration, but the force of the thrust which produces the rebound. Apparatus using this method (e.g. Austrian Patent Specification No. 238,976 and French Patent Specification No. 1,472,986) are based on the following principle. A stressed spring or an electromagnet, for example, accelerates a hammer which with its mass strikes a slug-shaped probe on to the specimen. The softer the specimen, the more the energy of the stroke or thrust is absorbed by deformation of the specimen, that is, the gentler is the thrust. The harder the specimen, the greater is the thrusting force. This force is measured by piezoelectric elements placed, for example, between the hammer and the probe, so that when the probe hits the specimen the hammer exerts on the piezoelectric elements a pressure corresponding to the thrusting force. Alternatively, the piezoelectric elements may be placed at the trailing end of the hammer with a second, smaller weight so that the piezoelectric voltage generated is proportional to the acceleration of the hammer. The voltage which the piezoelectric crystals generate and which is displayed on an electric meter, increases with the pressure and is proportional to the thrusting force which corresponds to the hardness of the specimen. The thrusting force follows a curve, first rising to a maximum and then returning to zero. The criterion of the hardness of the specimen is the maximum thrusting force, that is, the maximum voltage displayed by the meter at the top of the curve. Compared with the methods described above this method has the advantage of being largely independent of the mass of the specimen. However, it has the disadvantage of limited measuring accuracy, since electrical voltages can of course be measured only with limited precision. Another disadvantage is that the thrusting force depends on the striking energy, which is affected by gravity, and since the effect of gravity varies with the direction of thrust the apparatus depends to some extent on the direction of thrust. This dependence can be compensated for only by using additional apparatus and only with fair accuracy. A further substantial disadvantage is that the voltage produced by piezoelectric crystals under a given pressure differ widely, and these differences must be eliminated by calibrating each piezoelectric element or each set of apparatus.

Attempts have been made to measure Young's Modulus as a result of striking contact time between a striking member and a specimen. For example U.S. Pat. No. 3,333,461 to Gordon et al uses a movable member which comprises the striking member and probe and a measurement of the time at which impact contact takes place is made for the determination of an elastic modulus measurement. Since there exists no exact correlation between Young's Modulus and hardness, Gordan's device cannot be used as a hardness tester.

SUMMARY OF THE INVENTION

In accordance with the present invention there is provided a method and apparatus for testing a specimen for hardness in which a striking member is moved against a probe to cause the probe to become accelerated and to strike against a specimen and to rebound into contact with the probe. The method and apparatus includes the measuring of the time in which the striking member first hits the probe and then the probe strikes the specimen and rebounds into contact with the probe again.

The invention provides a method and apparatus for testing hardness by a dynamic method but which avoids the disadvantages of the known methods and apparatus and in particular provides a very simple means and a modest technical outlay to produce a maximum of measuring accuracy. The device which is employed with the invention includes a simple means for measuring the initial contact of a striking member with a probe member and the final contact of the probe member with striking member after it rebounds from the specimen. By measuring the time of movement of the probe between its initial contact with the striking member and its return contact thereto a very definite indication of the hardness of the specimen is obtained in a measurement which depends upon penetration of the probe into the specimen.

Accordingly it is an object of the invention to provide a method of testing specimens for hardness using a movable striking member and a specimen contacting probe which is moved by the striking member to contact the specimen and also using an electrical chronometer which is connected between the probe and striking member which comprises placing the probe directly adjacent the specimen and moving the striking member to hit the probe to cause it to move away from the striking member and to start the electrical chronometer and to penetrate the specimen and thereafter permitting the probe to move back into contact with the striking member after rebound from the specimen to stop the chronometer to indicate a time which is a measurement of the hardness of the specimen.

A further object of the invention is to provide an apparatus for conducting hardness testing which is simple in design, rugged in construction and economical to manufacture.

GENERAL DESCRIPTION OF THE PREFERRED EMBODIMENTS

Figure 1:
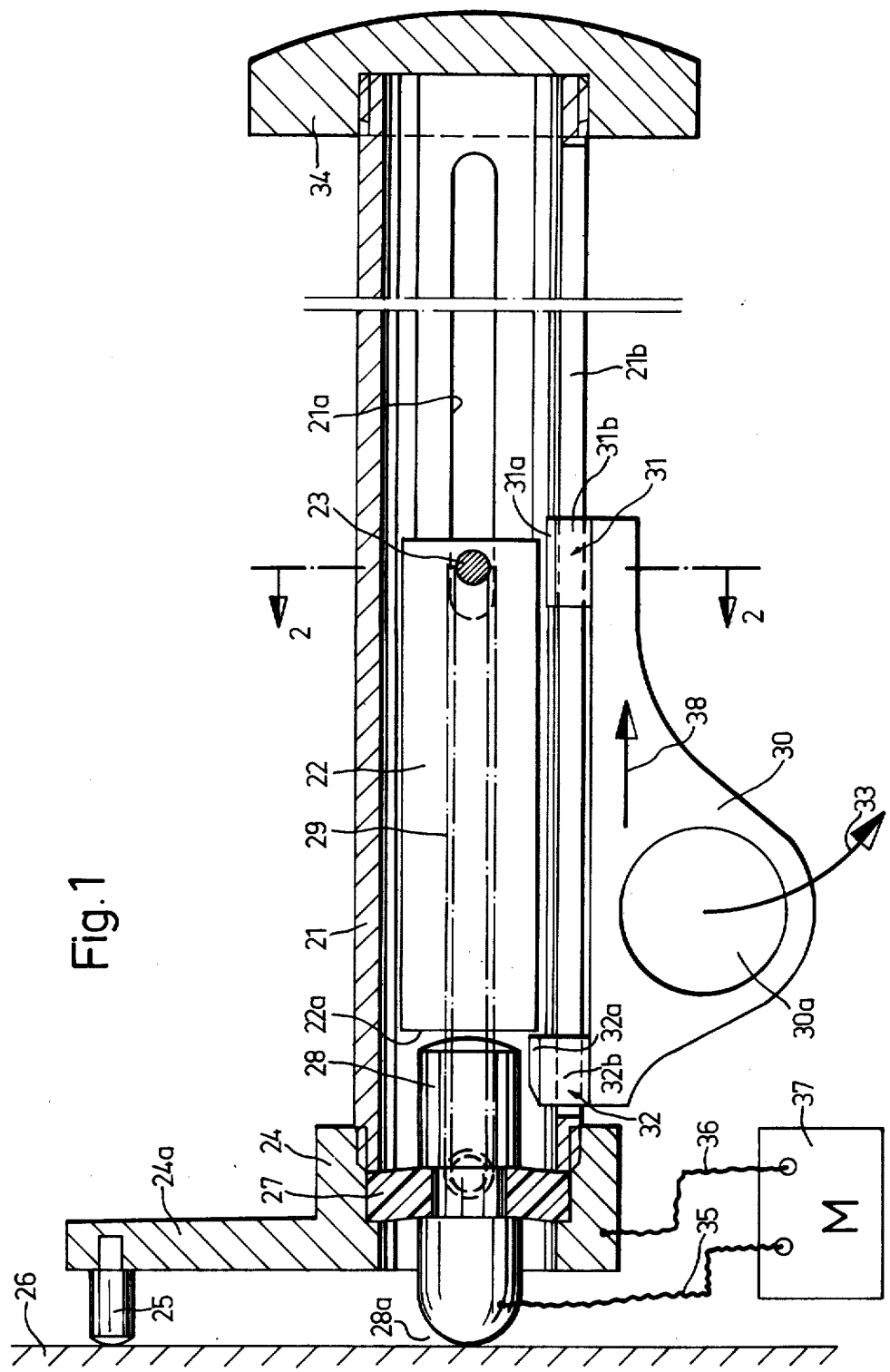
FIG. 1 is a vertical sectional view of an apparatus for testing hardness constructed in accordance with the invention.
Figure 2:
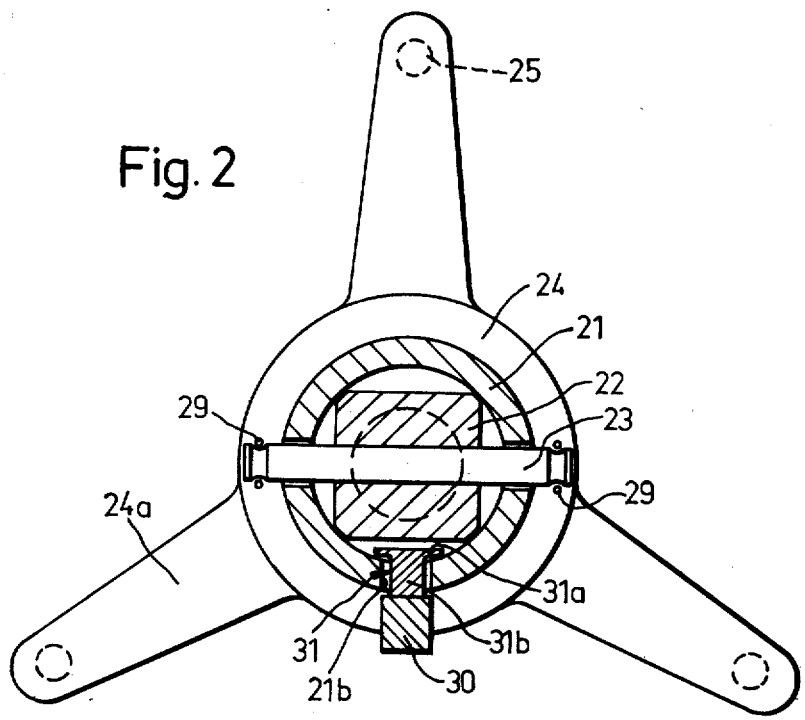
FIG. 2 is a section taken along the line 2—2 of FIG. 1.
Figure 3:
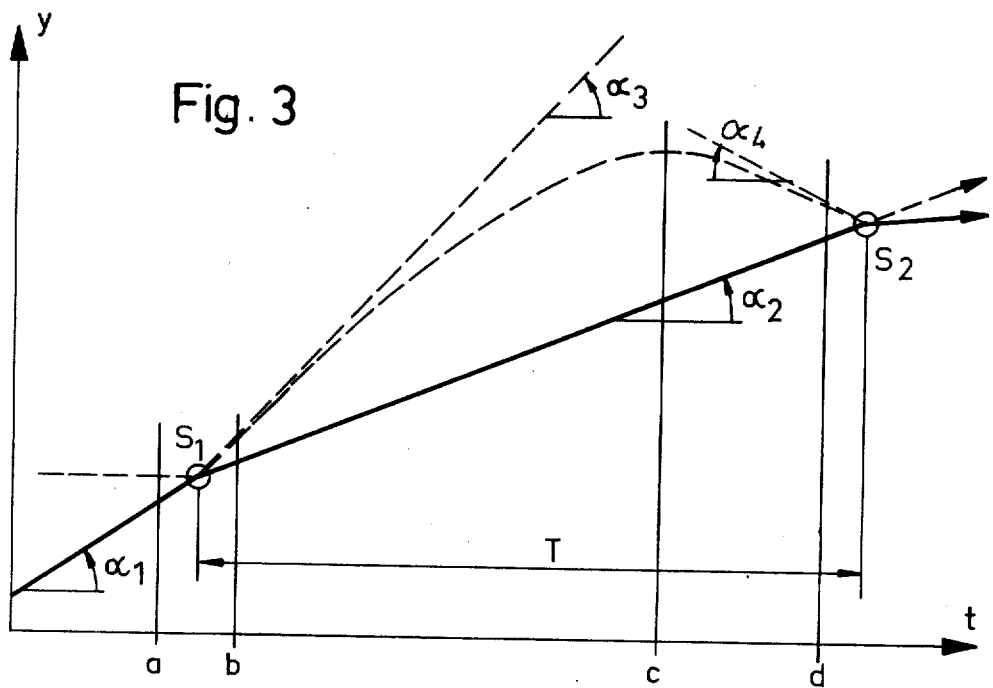
FIG. 3 is a curve of distance and time indicating the movements of the probe and striking member.

Referring to the drawings in particular the invention embodied therein in FIGS. 1 to 3 comprises a hardness tester generally designated 1 which includes a striking member 22 of hardened steel which is longitudinally movable in a tubular casing or housing 21. The striking member 22 has a square cross-section and bears on the inside wall of the tubular case 21 only by way of its chamfered longitudinal edges. A pin 23 housed in a transverse bore at one end of the striking member 22 projects through two mutually opposite longitudinal slots 21a in the tubular case 21 and prevents the striking member 22 from turning about its longitudinal axis. A boss 24 screwed onto the leading end of the case 21 has three arms 24a provided with respective electrically non-conductive feet 25 by which the striking instrument is applied to the surface of a specimen 26. The trailing end of the case 21 is closed by a cap 34. A ring 27 of resilient and electrically non-conductive material, for example rubber or a resilient synthetic plastics material, is clamped between an internal shoulder of the boss 24 and the leading end of the case 21. A probe 28 is fixed in the ring 27, in such a way that its leading end 28a bears with slight prestress on the specimen 26. The probe 28 is made from hardened steel and has a spherically curved surface at each end.

To produce the striking force the striking member 22 is pulled forwards to engage the probe 28 by two coil springs 29, fixed to the pin 23 at one end and to the boss 24 at the other. A slider 30 with a finger hole 30a is used to pull back the striking member 22 and to stress the springs 29. This slider is movable along the case 21 and has guide members 31, 32 which project through a slot 21b in the case 21 and which are provided with shoulders 31a, 32a respectively inside the case 21. A neck portion 32b on the guide member 32 is somewhat longer than a neck portion 31b on the guide member 31, so that when the slider 30 is pressed on to the case 21 the shoulder 32a can act on the end face 22a of the striking member 22 and can therefore entrain this member 22.

By tilting the slider 30 about the guide member 31 as indicated by an arrow 33, the guide member 32 can be drawn slightly out of the case 21 and its shoulder 32a can be moved out of the path of the striking member 22, releasing the member 22 so that it can strike.

An electrical chronometer incorporated in a unit 37 is connected by a lead 35 to the probe 28 and by a lead 36, by way of the flange 24 and springs 29, to the striking member 22.

To test the hardness of the specimen 26, the feet 25 of the striking instrument are applied to the specimen and the cap 34 is gripped with one hand, while the other hand grips the slider 30 at its finger hole 30a, draws it back in the direction of an arrow 38 until the pin 23 reaches the end of the slot 21a, to stress the springs 29, and then tilts it as described above to initiate the stroke, so that the shoulder 32a releases the striking member 22 and the springs 29 cause the member 22 to strike the probe 28, which in turn strikes the specimen 26.

In this embodiment the mass of the probe 28 amounts, for example, to 20% or more of the mass of the striking member 22, so that the mass of the probe is not negligible in relation to the latter. The thrusting motion therefore takes place as illustrated by the graph in FIG. 3, in which the distances travelled by the striking member 22 or probe 28 are plotted on a $y$ axis against the time on $t$ axis. Another condition for a curve such as that shown in FIG. 3 is that the mass of the specimen 26 be large in relation to the probe 28 and that the specimen should not move as a result of being struck.

The striking member 22 first travels at the speed $tg \alpha_1$ (thick solid line) imparted to it by the springs 29, until at point $S_1$ it hits the stationary probe 28, which is bearing on the specimen 26. This starts the thrusting motion, that is, the penetration of the probe 28 into the specimen 26, and at the same time this first physical contact between the striking member 22 and probe 28 closes the electrical contact between them, so that the chronometer 37 receives a first electrical pulse and begins measuring the duration T of the thrusting motion. Since the mass of the probe 28 is relatively large, the striking member 22 and probe 28 do not proceed at the same speed. On the contrary, the probe 28 penetrating into the specimen 26 moves at the relatively higher initial speed (dotted line curve) and immediately the thrusting motion begins, whereas the striking member 22, having been braked by the blow, moves at a reduced and relatively lower speed $tg\alpha_2$ (along the thick solid line) in accordance with the energy lost to the probe 28. The probe 28 therefore runs ahead of the striking member 22 at a higher speed, so that the two move away from one another and the electrical contact between them is broken again. As the thrusting motion continues the initial speed $tg\alpha_3$ of the probe 28 is braked as it penetrates the specimen 26 (rising branch of broken-line curve), until the movement stops (top of broken-line curve) and the rebound of the probe 28 bouncing off the specimen 26 begins (falling branch of broken-line curve), so that the striking member 22 and probe 28 collide a second time at the point $S_2$. The position of this point depends on the ratio between the masses of the components 22 and 28 and is therefore determined by the construction of the striking instrument. This second collision between the striking member 22 and probe 28 ends the thrusting motion, and at the same time the physical contact between the two components closes the electrical contact again so that a second electrical pulse is fed to the chronometer 37, to end the measurement of the duration T of the thrusting motion.

The time measured for the duration of a thrusting motion as described above may for example be of the order of $3\cdot10^{-6}$ sec and the chronometer may advantageously be provided with a conventional digital display. The appropriate hardness for the specimen can then be taken off a calibrating table or calibrating curve. Alternatively, of course, the chronometer could be provided with an indicator and the hardness read directly off the indicator.

Figure 4A:
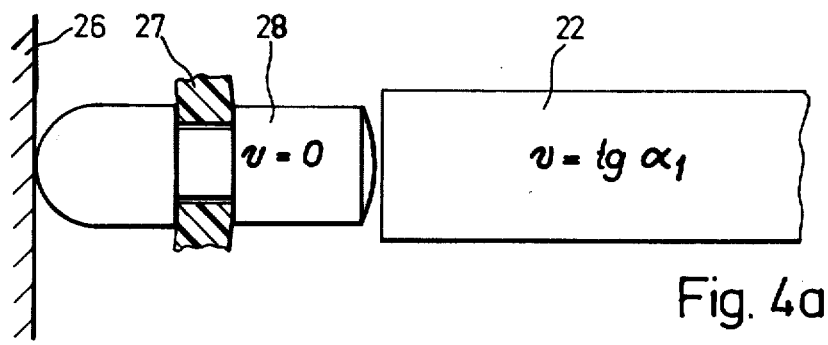
FIGS. 4a, 4b, 4c and 4d are schematic representations showing the movement of the striking member and probe to effect testing for hardness.
Figure 4B:
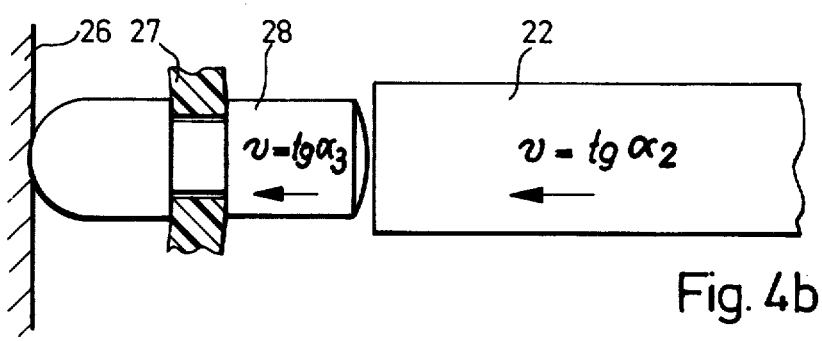
Figure 4C:
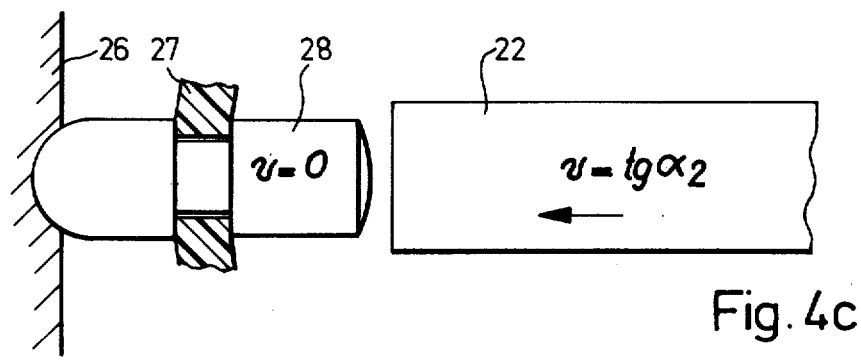
Figure 4D:
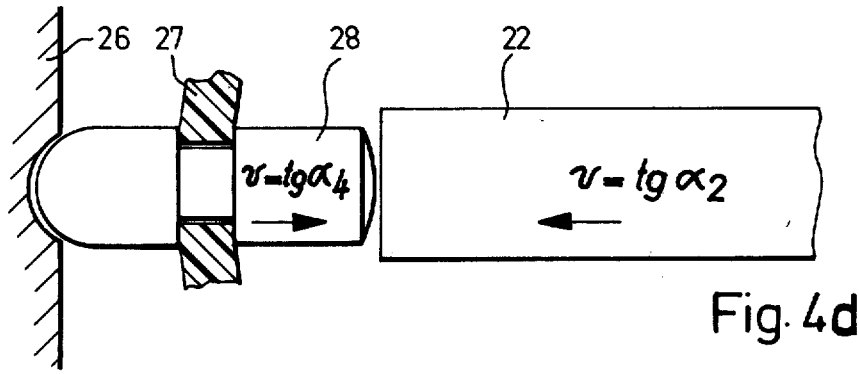

As shown in FIGS. 4a to 4d the striking member 22 is first moved into association with the probe 28 as shown in FIG. 4a and after contact therewith as shown in 4b the probe 28 moves at a faster speed than the striking member 22. The chronometer is connected so that it measures the time at which the probe leaves the striking member 22 and begins to move against the specimen 26. Generally, the probe 28 is located initially so that it will begin immediately to enter into the specimen. The striking member 22 will then move at a velocity which is lower than the probe 28 and the probe 28 after hitting the specimen 26 as shown in FIG. 4c will begin a return movement as shown in 4d until contact takes place and another time measurement is made.

Figure 5:
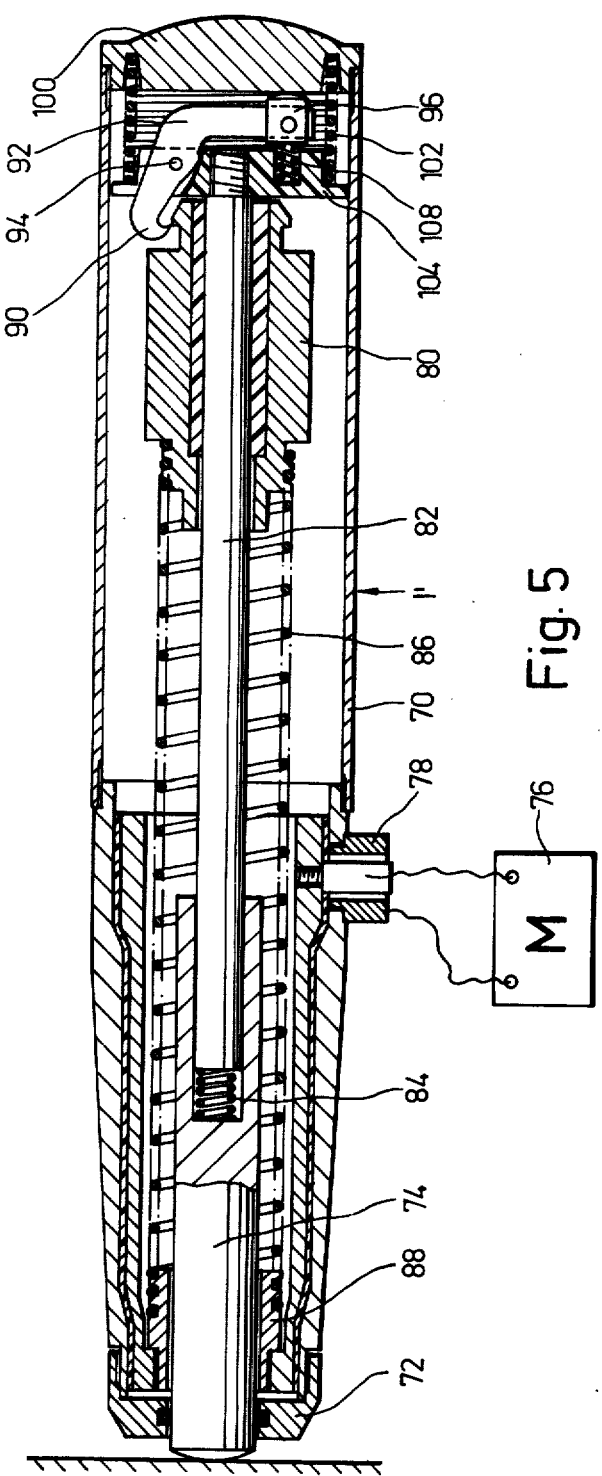
FIG. 5 is a sectional view of another embodiment of a hardness tester.
Figure 6:
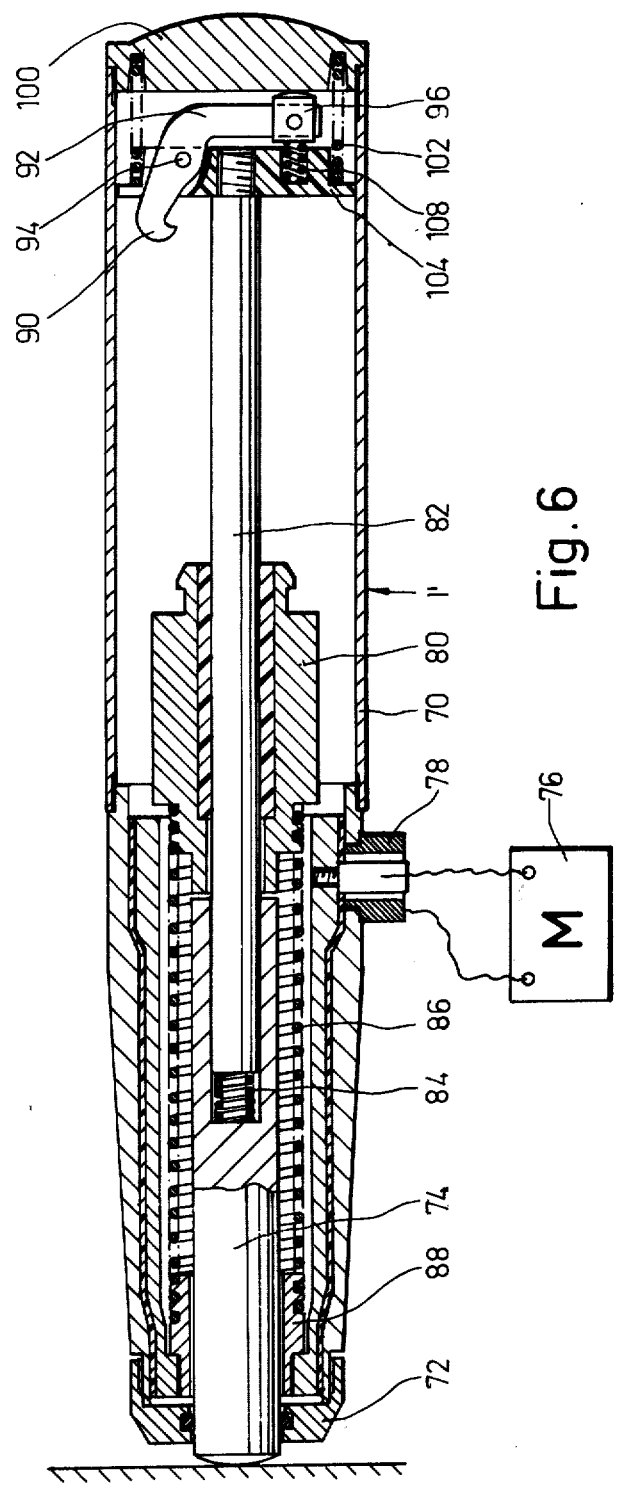
FIG. 6 is a view similar to FIG. 5 indicating the device after the striking member has been moved against the probe.

In the embodiment shown in FIGS. 5 and 6 the hardness tester generally designated 1' includes a housing 70 having a forward tip portion 72 having an opening therein for the passage of a probe 74. An electrical chronometer 76 is connected to a terminal 78 such that its electrical circuit is actuated by contact between the probe and a striking member 80. The striking member 80 is slidable on a rod 82 which is biased by a spring 84 away from the probe 74 and it is engaged with one end of a force producing coil spring 86 which has its opposite end anchored on a sleeve 88 held to the housing 70. The striking member 80 is moved outwardly against the compressing force of the spring 86 until it is engaged with a hook 90 of a pivotal lever member 92 which is pivoted at 94 on the upper end of the housing 70. The lever 92 includes an arm pad 96 which is located below a striking head 100. The striking head 100 is held on the end of a coil spring 102 which has its opposite end held by a sleeve member 104 in the housing. When the striking head 100 is moved inwardly for example by the force of a person's hands or by a hammer blow depending upon the size of the spring 102 it moves the pad portion 96 against a spring 108 to pivot the lever 92 and cause the hook 90 to become disengaged from the striking member 80. Striking member 80 then moves downwardly into association with the probe 74 to strike it and to move it into the specimen. The measurement time between the initial contact of the striking member with the probe 74 and the subsequent rebound of the probe from the specimen to the striking member again is recorded by the electrical chronometer 76.

Figure 7:
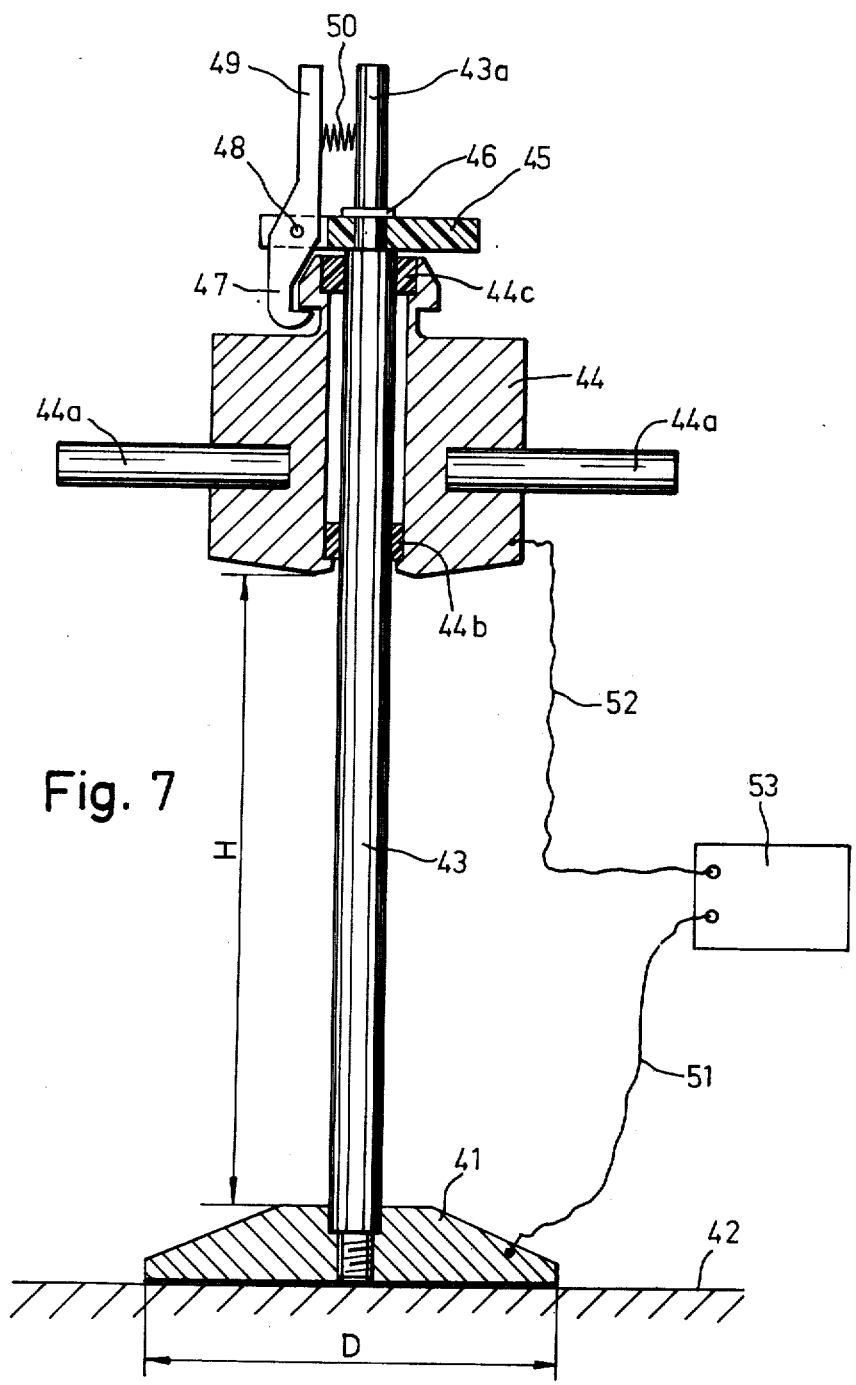
FIG. 7 is a vertical sectional view of still another embodiment of the invention.

The embodiment shown in FIG. 7 illustrates a striking instrument for measuring the hardness, that is, the resistance to penetration, of a subsoil or banked soil. The probe is a circular thrust plate 41 on which the striking instrument is set up on the ground 42 being tested. A guide rod 43 for a striker 44 is fixed to the center of the thrust plate 41. The drop height H of the striker is determined by a disc 45 of electrically insulating material placed on the rod 43. The components of the apparatus may, for example, have the following dimensions and masses:

diameter D of thrust plate 41: 25 cm
mass of thrust plate 41 including guide rod 43: 20 kg
mass of striker 44: 40 kg
drop height H: 50 cm.

The mass of the thrust plate 41 forming the probe is again not negligible relative to that of the striker 44, so that the above comments on the embodiment shown in FIGS. 3 and 4 in the description relating to FIG. 5, also apply to the present embodiment. The striker 44 has two handles 44a for pulling it up and also for carrying the entire tester. Bushes 44b, 44c of electrically insulating material pressed into the bore in the striker 44 guide the striker on its rod 43. A recess in the disc 45, which is secured with a circlip 46, accommodates a latch 47 rotatably mounted on a pin 48. A spring 50 supported on the end 43a of the rod 43 presses resiliently on the handle 49 of the latch 47 so that the latter engages the striker 44 and locks it in its upper rest position. Operation of the handle 49 causes the latch 47 to release the striker 44 so that it can strike the thrust plate. The thrust plate 41 and striker 44 are connected by leads 51, 52 to an electrical chronometer 53 which measures the time from the first to a second physical contact between the striker 44 and plate 41, as in the embodiment described with reference to FIGS. 1 and 3.

While specific embodiments of the invention have been shown and described in detail to illustrate the application of the principles of the invention, it will be understood that the invention may be embodied otherwise without departing from such principles.

What is claimed is:

1. A method of testing specimens for hardness using a movable striking member and a specimen contacting probe which is moved by the striking member to contact the specimen and using an electrical chronometer which is connected between the probe and the striking member, comprising placing the probe directly adjacent the specimen and moving the striking member to hit the probe to cause it to move away from the striking member to start the electrical chronometer and to penetrate the specimen, and permitting the probe to move backwardly into contact with the striking member after rebound from the specimen to stop the chronometer whereby the time indicated by the chronometer is a measure of the hardness of the specimen.

2. A method according to claim 1, including biasing the striking member toward engagement with the probe and initially tensioning the biasing means by moving the striking member in a direction away from the probe and thereafter permitting the biasing means to move the striking member against the probe.

3. Method according to claim 1, wherein the probe employed comprises a flat plate which is positioned directly on the specimen and including lifting the striking member a predetermined height above the flat plate probe and permitting it to drop by gravity into contact with the probe to effect the striking force.

4. A device for testing hardness of specimens, comprising an impact tool having a housing with a striking member movable therein, an impact probe held elastically in said housing in the path of movement of said striking member and being movable thereby out of said housing to contact the specimen, means for engaging said striking member to move said striking member to hit said impact probe and to move said probe to strike against the specimen, said striking member having a mass greater than or equal to the mass of said probe, electrical circuit means connected between said striking member and said probe including an electrical timer having a switching means connected to said striking member and said impact probe which are closable by a first contact of said striking member with said probe to start the timer and which are closable to stop the said timer by a following contact of said striking member with said probe upon rebound from the specimen, whereby the time indicated by said timer provides an indication of the hardness of the specimen.

5. A device according to claim 4, wherein said housing comprises an elongated tube having an end through which said probe extends with an outwardly extending portion, said means for engaging said striking member comprising a handle slidable back and forth along said housing and having a portion which is engageable with said striking member to move said striking member in said housing, and spring means biasing said striking member toward engagement with said probe.

6. A device according to claim 4, wherein said housing comprises an elongated tubular member having an end with an opening therein through which said probe extends, an opposite end of said housing having an actuating member thereon said actuating member being movable in said housing, biasing means engageable between said impact member and the end of said housing through which said probe extends urging said impact member toward engagement with said probe, latching means carried in said housing for latching said impact member at a spaced location from said probe when said biasing means is extended, said movable member being movable to engage said latching means to release said impact member to cause said spring to move it against said probe.

7. A device according to claim 4, wherein said probe includes a flattened probe member having a surface adapted to bear against the specimen, said striking member comprising a weight, a rod engaged with said probe extending upwardly therefrom, said striking member weight being movable along said rod, means on said rod for latching said weight at a location spaced above said probe, said means being releasable to drop said weight on said probe.

8. A hardness testing device comprising an elongated tubular housing having a widened base portion with an insulated forwardly extending tip adapted to rest against a specimen, said base portion having an opening therethrough, a probe having a portion extending outwardly from said opening adapted to engage the specimen at its forward end, a striking member located in said housing above said probe, a handle slidable along said housing having a lower end portion engageable below said probe and being raisable in said housing to lift said probe, spring means in said housing biasing said striking member in a direction toward engagement with said probe, said striking member having a mass greater than or equal to the mass of said probe, and an electrical chronometer connected between said probe and said striking member being actuable by contact of said probe with said striking member to begin a timing indication and to terminate the timing indication upon a subsequent reconnection of said probe with said striking member.

9. A hardness testing device comprising a flat plate probe, a rod connected to one side of said probe and extending upwardly therefrom, a weight having a bore therethrough engageable over said rod and being slidable upwardly and downwardly on said rod, latching means on said rod for latching said weight in a raised position above said probe and electrical chronometer means connected between said weight and said probe for measuring the time elapsed between a first contact of said probe with said weight and a subsequent contact of said probe with said weight said weight having a mass greater than or equal to the mass of said probe.

* * * * *